Nov. 6, 1945.  H. M. COLLINS  2,388,600
POLYMERIZATION IN EMULSION
Filed Sept. 4, 1942
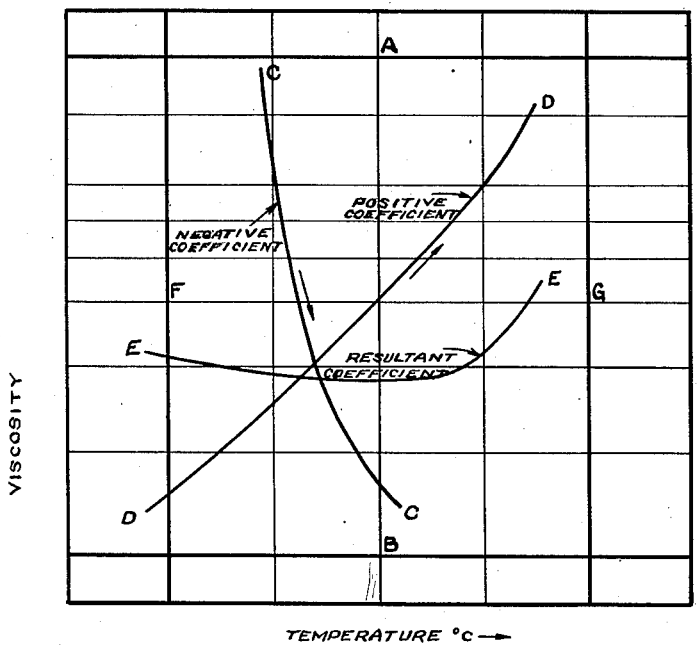
INVENTOR
HENRY MICHAEL COLLINS
By
ATTORNEY Patented Nov. 6, 1945

2,388,600

UNITED STATES PATENT OFFICE 2,388,600

POLYMERIZATION IN EMULSION

Henry Michael Collins, Shawinigan Falls, Quebec, Canada, assignor to Shawinigan Chemicals Limited, Montreal, Quebec, Canada, a corporation of the Dominion of Canada Application September 4, 1942, Serial No. 457,337
In Canada April 4, 1942

21 Claims. (Cl. 260—8)

INTRODUCTION

This invention relates to stable emulsoids of water insoluble resins and to a process of polymerizing in emulsion.

The art of polymerizing in emulsion has developed rapidly of recent years. As one of the early developments, a process was discovered for emulsifying styrols in a water emulsion using a soap as the dispersing agent. Later, there came a proposal to polymerize vinyl acetate after first dispersing it in water with substances such as soaps of the naphthene sulphonic acids or sulphonated castor oils as emulsifying agents. Then followed the suggestion of using polyvinyl alcohol as an emulsifying agent in the preparation of aqueous emulsions of polyvinyl esters.

These and other prior art processes suffer from certain disadvantages. Sometimes, the emulsoid formed is not sufficiently stable and will break prematurely or else stability is achieved at the expense of considerable proportions of the monomer remaining unchanged. When soaps are used, they often contaminate and discolor the polymer, some of the soap being tenaciously adsorbed on the extensive surface of the dispersed phase, so that the resulting product is objectionably colored. These emulsions are usually unstable. Most, if not all, of the proposed agents must be used in relatively high concentration to be effective, which both accentuates any contaminating properties and renders the process costly. Moreover, suitable emulsifying agents capable of protecting polyvinyl ester emulsions under the extremes of temperature encountered during and after polymerization are not common.

OBJECTS

Having regard to the foregoing, it is a principal object of the present invention to provide improved stable emulsoids of polymers. It is a further object of the invention to provide emulsoids of this type free from objectionable impurities. It is a still further object of the invention to provide an improved process of polymerizing in emulsion. Further objects are to provide a process in which polymerization is carried to substantial completion and an emulsoid in which the residual monomer is substantially at a minimum concentration. It is a further object to provide a process in which low concentrations of the emulsifying material can be employed. It is a still further object to provide emulsifying compositions which in low concentrations are effective to protect the emulsion-emulsoid at temperatures encountered in polymerization.

It has been found that these objects can be achieved by polymerizing the monomer as the dispersed phase of an aqueous emulsion protected by hydrophilic colloidal material effective at a low concentration to maintain its emulsifying power over a wide temperature range. Examples of such substances are found in combinations of two or more emulsifying agents which are hydrophilic colloids having in solution different temperature coefficients of viscosity such that they are effective in surprisingly low concentrations when used together, to protect the emulsion-emulsoid over the range of temperatures encountered during manufacture, storage and use. Generally, the types of colloids which may be used together have opposed temperature coefficients of viscosity, i. e. one positive and one negative, but in certain cases those with the different, but not opposed coefficients, i. e. both positive or both negative, are effective. In any event, the colloids must be such that their resultant temperature coefficient of viscosity in solution is maintained within certain predetermined limits known to be effective for the purposes outlined, when they are employed at proper concentrations and under suitable conditions. The concentrations of the emulsifying agents will vary in total and in ratio depending upon the particular colloids used. Colloids which alone are useless can thus be employed in combination with others having complementary properties. In preferred proportions very low concentrations of these emulsifying agents are operable, to protect the emulsion-emulsoid up to temperatures reached in bringing about complete polymerization and down to temperatures encountered in storage and transit, under the usual precautions.

Broadly, in a preferred procedure according to the invention, the emulsifying agents are first dissolved in water, preferably at depressed surface tension which can be effected by adding a depressant, and the solution stirred rapidly. The monomer is then added slowly with adequate stirring which is continued for several minutes. Then a suitable catalyst is added and the entire charge brought slowly to polymerization temperature. The temperature is gradually increased over a period, to complete the run. The result is a permanent emulsoid which will, under normal conditions, retain its stability indefinitely. The polymer recovered from the emulsoid by evaporation of the external phase, or otherwise, has characteristic properties resulting from the way in which it is prepared.

In this process, the sequence of addition of the constituents of the emulsion is important. Stirring is also important. Up to a certain point the better the stirring, the smaller the dispersed particles in the emulsion and consequently in the resulting emulsoid. Depressed surface tension helps considerably in obtaining a stable emulsoid, supplementing the stabilizing effect of stirring. Necessary characteristics of the depressant are that it must not react with the polymer, with the emulsifying agent, catalyst, accelerator for the catalyst, or with any other material which may be present.

EXAMPLES

The following examples in which characteristic quantitative procedures are set forth and the accompanying explanation, make the invention understood more specifically. These examples are not to be considered in a limiting sense.

Example I

In one procedure, the following materials were substantially as indicated with regard to concentrations and conditions.

| | | |
|---|---|---|
| Methyl cellulose | per cent | [1] 0.5 |
| Gum tragacanth | do | [1] 0.25 |
| "Aerosol O.T." | do | [1] 0.1 |
| Water | grams | 537 |
| Vinyl acetate | do | 690 |
| Benzoyl peroxide | do | 0.69 |

[1] Taken by weight on the total charge.

The gum tragacanth and the methyl cellulose—the emulsifying agents; and the "Aerosol O.T."—a surface tension depressant; were put into solution and added to the water in the order named, in a reflux apparatus and mixed by stirring rapidly, that is, at about 1200 to about 1500 R. P. M. for about one minute. To this solution, the vinyl acetate was added slowly, with stirring at about 1200 R. P. M. which was continued for about five minutes. The benzoyl peroxide catalyst was added prior to the addition of the vinyl acetate and the whole charge brought to reflux temperature of about 66° C. The run was completed when the temperature had reached the neighborhood of 80° C. to 85° C. that is, in about 2 hours and 45 minutes.

The charge was then cooled. The resulting emulsoid was very thick, very creamy and stable. It contained about 50% solids and about 3.0% residual vinyl acetate.

A film was laid down from the emulsion by evaporation of the external phase. This film was found to be tough and elastic and extremely resistant to re-emulsification.

Example II

The following materials were employed in substantially the concentrations given.

| | | |
|---|---|---|
| Methyl cellulose | per cent | [1] 0.5 |
| Starch (potato) | do | [1] 0.5 |
| "Aerosol O.T." | do | [1] 0.1 |
| Water | grams | 537 |
| Vinyl acetate | do | 690 |
| Benzoyl peroxide | do | 0.69 |

[1] Taken by weight on the total charge.

Methyl cellulose and starch are the emulsifying agents. The constituents were subjected to treatment substantially as in Example I according to the changed materials and concentrations set out above with the following results. The figures given are approximate.

| | |
|---|---|
| Temperature | Min. 56° C. / Max. 83° C. |
| Time for polymerization | 2 hrs. 15 mins. |
| Condition of emulsoid | Creamy, fine, stable |
| Proportion of solids | 49% |
| Residual vinyl acetate | 3% |
| Viscosity of polyvinyl acetate | 80 cps. |
| Viscosity of emulsoid | 585 cps. |

Example III

The following materials were employed in substantially the concentrations given.

| | | |
|---|---|---|
| Methyl cellulose | per cent | [1] 1.5 |
| Gum tragacanth | do | [1] 1.25 |
| "Aerosol O.T." | do | [1] 1.1 |
| Water | grams | 537 |
| Methyl acrylate | do | 690 |
| Benzoyl peroxide | do | [2] 0.40 |

[1] Taken by weight on the total charge.
[2] Plus retardant.

Methyl cellulose and gum tragacanth are the emulsifying agents. The constituents were subjected to treatment substantially as in Example I according to the changed materials and concentration set out above with the following results. The figures given are approximate.

| | |
|---|---|
| Temperature | Min. 76° C. / Max. 86° C. |
| Time for polymerization | 5 hours |
| Condition of emulsoid | Fine, creamy, quite thick, stable. |
| Proportion of solids | 51% |
| Residual methyl acrylate | 5% |
| Viscosity of emulsoid | 600 cps. |

Example IV

The following materials were employed in substantially the concentrations given.

| | | |
|---|---|---|
| Hydrolyzed polyvinyl acetate [acetate group content about 40%, p. v. a. viscosity 7 cps. (positive gradient)] | per cent | [1] 0.5 |
| Hydrolyzed polyvinyl acetate [acetate group content about 10%, p. v. a. viscosity 7 cps. (negative gradient)] | per cent | [1] 0.5 |
| "Aerosol O. T." | do | [1] 0.1 |
| Water | grams | 537 |
| Vinyl acetate | do | 690 |
| Benzoyl peroxide | do | 0.69 |

[1] Taken by weight on the total charge.

The hydrolyzed polyvinyl acetates of different acetate group contents and different temperature viscosity coefficients were the emulsifying agents. The constituents were subjected to treatment substantially as in Example I according to the changed conditions set out above with the following results. The figures given are approximate.

| | |
|---|---|
| Temperature | Min. 56° C. / Max. 80° C. |
| Time for polymerization | 3 hours |
| Condition of emulsoid | Thick, white, greasy, stable. |
| Proportion of solids | 50% |
| Residual vinyl acetate | 4.5% |
| Viscosity of emulsoid | 500 cps. |
| Viscosity of polyvinyl acetate | 120 cps. |

Example V

The following materials were employed in substantially the concentrations given.

| | |
|---|---|
| Partially hydrolyzed polyvinyl acetate [acetate group content about 40%, p. v. a. viscosity of original polyvinyl acetate 7 cps. (positive gradient)] [1]___per cent__ | 0.5 |
| Gum tragacanth_____do____ [1] | 0.25 |
| "Aerosol O. T."_____do____ [1] | 0.1 |
| Water _____grams__ | 537 |
| Vinyl acetate _____do____ | 690 |
| Benzoyl peroxide_____do____ | 0.69 |

[1] Taken by weight on the total charge.

The hydrolyzed polyvinyl acetate and gum tragacanth are the emulsifying agents. The constituents were subjected to treatment substantially as in Example I according to the changed materials and concentrations set out above with the following results. The figures given are approximate.

| | |
|---|---|
| Temperature | Min. 56° C. / Max. 83° C. |
| Time for polymerization | 3 hours 10 minutes |
| Condition of emulsoid | Stable, thin, creamy, white. |
| Proportion of solids | 52% |
| Residual vinyl acetate | 0.9% |
| Viscosity of emulsoid | 280 cps. |
| Polymer viscosity | 100 cps. |

Example VI

The following materials were employed in substantially the concentrations given.

| | |
|---|---|
| Methyl cellulose (low viscosity, 25 cps.)_____per cent__ [1] | 0.5 |
| Partially hydrolyzed polyvinyl acetate [acetate group content 33%, p. v. a. viscosity 7 cps. (negative coefficient)]___per cent__ [1] | 0.5 |
| "Aerosol O. T."_____do____ [1] | 0.1 |
| Water _____grams__ | 537 |
| Vinyl acetate _____do____ | 690 |
| Benzoyl peroxide_____do____ | 0.69 |

[1] Taken by weight on the total charge.

The methyl cellulose and the hydrolyzed polyvinyl acetate were the emulsifying agents. The constituents were subjected to treatment substantially as in Example I according to the changed materials and concentrations set out above with the following results.

| | |
|---|---|
| Temperature | Min. 56° C. / Max. 83° C. |
| Time for polymerization | 4 hours |
| Condition of emulsoid | Stable, fairly thick, creamy. |
| Proportion of solids | 51% |
| Residual vinyl acetate | .9% |
| Viscosity of emulsoid | 420 cps. |
| Polymer viscosity | 110 cps. |

Example VII

The following materials were employed in substantially the concentrations given.

| | |
|---|---|
| Methyl cellulose (viscosity 25 cps.)_____per cent__ [1] | 0.25 |
| Gum tragacanth_____do____ [1] | 0.12 |
| Hydrolyzed polyvinyl acetate [acetate group content 33%, p. v. a. viscosity 7 cps. (negative coefficient)]___per cent__ [1] | 0.1 |
| "Aerosol O. T."_____do____ [1] | 0.1 |
| Water _____grams__ | 537 |
| Vinyl acetate _____do____ | 690 |
| Benzoyl peroxide_____do____ | 0.69 |

[1] Taken by weight on the total charge.

Methyl cellulose, gum tragacanth and hydrolyzed polyvinyl acetate were the emulsifying agents. The constituents were subjected to treatment substantially as in Example I according to the changed materials and concentrations set out above with the following results. The figures given are approximate.

| | |
|---|---|
| Temperature | Min. 56° C. / Max. 83° C. |
| Time for polymerization | 3 hours |
| Condition of emulsoid | Stable, fairly thick, creamy |
| Proportion of solids | 53% |
| Residual vinyl acetate | 1% |
| Viscosity of emulsoid | 400 cps. |
| Polymer viscosity | 112 cps. |

Example VIII

The following materials were employed in substantially the concentrations given.

| | |
|---|---|
| Methyl cellulose _____per cent__ [1] | 0.6 |
| Gum arabic _____do____ [1] | 0.6 |
| "Aerosol O. T."_____do____ [1] | 0.1 |
| Water _____gram__ | 800 |
| Vinyl acetate _____do____ | 930 |
| Benzoyl peroxide _____do____ | .93 |

[1] Taken by weight on the total charge.

Methyl cellulose and gum arabic were the emulsifying agents. The constituents were subjected to treatment substantially as in Example I according to the changed materials and concentrations set out above with the following results. The figures given are approximate.

| | |
|---|---|
| Temperature | Min. 56° C. / Max. 83° C. |
| Time for polymerization | 2 hours |
| Condition of emulsoid | Stable |
| Proportion of solids | 51% |
| Viscosity of polyvinyl acetate | 145 cps. |
| Acid value | Negligible |
| Viscosity of emulsoid | 48 cps. |

Example IX

The procedure of Example VIII is followed with the exception that about 0.5% of gum arabic was employed and in addition about 0.1% of a partially hydrolyzed polyvinyl acetate having an acetate group content of about 31% made from a polyvinyl acetate having a viscosity of 7 cps. was used. A finer grained emulsion than in Example VIII was obtained. Its stability was excellent.

Example X

A procedure similar to that of Example I was followed with the exception that a commercial product known as "Gomagel" an algae, was substituted for the gum tragacanth. A stable emulsion having approximately the same characteristics was formed.

Example XI

The following materials were employed in substantially the concentrations given.

| | |
|---|---|
| Gum tragacanth _____per cent__ [1] | 0.25 |
| Partially hydrolyzed polyvinyl acetate having an acetate group content of about 31%, made from polyvinyl acetate having a viscosity of about 7 cps. and a negative temperature coefficient of viscosity _____per cent__ [1] | 0.5 |
| "Aerosol O. T."_____do____ [1] | 0.1 |
| Water _____grams__ | 720 |
| Vinyl acetate _____do____ | 880 |
| Hydrogen peroxide _____per cent__ | 0.15 |
| Sodium bicarbonate (accelerator)__do____ | 0.05 |

[1] Taken by weight on the total charge.

The constituents were subjected to treatment substantially as in Example I but according to the changed materials and concentrations set out above with the following approximate results.

| | |
|---|---|
| Temperature | { Min. 56° C. <br> Max. 84° C. |
| Time for polymerization | 2 hours |
| Condition of emulsoid | Stable |
| Proportion of solids | 51% |
| Viscosity of polyvinyl acetate | 87 cps. |
| Acid value | Negligible |
| Emulsoid viscosity | 87 cps. |
| Residual vinyl acetate | 1.8% |

STARTING MATERIALS

It will be understood that the above examples are merely illustrative and that the mechanism of invention may be applied broadly to various polymerizable organic water-insoluble monomers, particularly the vinyl resins, specifically the polyvinyl esters, the acrylic resins, styrene, butadiene and other monomers used in the manufacture of synthetic rubber. Particularly good results may be achieved in polymerizing vinyl esters, such as the acetate, the propionate, the butyrate and the chloride. The acetate is preferred. Copolymerization of two or more different monomers may also be accomplished. The ratio of dispersed to external phase may be varied considerably. In the case of polyvinyl acetate, the preferred range is between about 50% and about 70% by weight of the total charge. It may be less than 50% but usually emulsions having a lower concentration than this are not commercially desirable.

EMULSIFYING AGENTS

The emulsifying agents applicable to the invention fall within the group of hydrophilic organic colloids resistant to hydrolysis by mild acid or base and substantially neutral as to pH. According to this invention, two or more of these colloids having different temperature coefficients of viscosity are used together to protect the emulsion-emulsoid over the entire range of temperatures encountered. It will be evident that the emulsifying composition must be capable of (a) acting as a liquid/liquid phase emulsifier at the commencement of the process, say about 20° C., (b) it must protect the emulsion at about 66° C. (the start of reflux) and finally, (c) it must protect the solid/liquid phase both at the maximum temperature encountered in polymerization at about 83° C. and afterwards at room temperature or lower, sometimes down to about 0° C. The applicant has found that the temperature coefficient of viscosity of the emulsifying material is important in performing these functions. He has found further that the effect of using together two suitable colloids, having different temperature viscosity coefficients is to bring the resultant temperature coefficient of viscosity of the emulsifying combination within the temperature viscosity limits known to be effective and to reduce the total concentrations of emulsifying agent required to protect the emulsion-emulsoid over the entire range of temperatures encountered.

For the purposes of this invention, these colloids classify into two groups, those having a positive temperature coefficient of viscosity in the higher temperature range, and those having a negative coefficient within this range. Among suitable colloids of the positive type are hydrophilic colloidal partially substituted celluloses such as methyl cellulose, benzyl cellulose, and partially hydrolyzed polyvinyl acetates having an acetate group content of between about 37($\pm$2)% and about 43%. Among suitable agents of the negative type are hydrophilic colloidal starches, partially hydrolyzed polyvinyl acetates having an acetate group content of between about 0.0% and about 35($\pm$2)% gums of the order of gum tragacanth, agar-agar, the commercial algae known as "Gomagel," gum arabic, and gum acacia, and gelatin. It should be mentioned that with hydrolyzed polyvinyl acetates in the range of acetate group content between about 33% and about 37% there is an inversion from resins having a positive temperature viscosity coefficient to those having a negative coefficient. As methods of preparation do not always give the exact acetate group content desired, it should also be ascertained which gradient a resin in this range has before assigning it to the positive or negative types. The hydrolyzed polyvinyl acetate may be made from polyvinyl acetates of different viscosities, of which those preferred are about 7 cps. and about 15 cps. The concentrations given in this application are based on partially hydrolyzed polyvinyl acetates made from polyvinyl acetates of viscosity about 7 cps. If partially hydrolyzed products made from polyvinyl acetates of other viscosities are employed, the concentrations will vary accordingly. It should also be mentioned that partially hydrolyzed polyvinyl acetates having a low acetate group content and polyvinyl alcohol do not give good results where a stable emulsion containing a substantial minimum of monomer is desired so that the preferred partially hydrolyzed polyvinyl acetates are those containing more than about 10% acetate groups.

Generally, the two colloids effective to maintain the temperature coefficient of viscosity of the combination within predetermined limits are one of the positive with one of the negative. For instance, methyl cellulose with gum tragacanth. On the other hand, there are certain cases in which two agents of the same type, i. e. negative or positive are effective to give the desired resultant temperature coefficient of viscosity, for instance, a partially hydrolyzed polyvinyl acetate, 31% acetate groups, viscosity 7 cps. and gum arabic which both belong to the negative group.

In terms of the invention, therefore, one emulsifying agent has properties which are complementary to those of the other, these properties being expressed in terms of a temperature and viscosity relationship. According to teachings of the invention, when the prescribed agents are used in combination, in suitable proportions and under suitable conditions, they have the effect of maintaining a comparatively level average temperature coefficient of viscosity. This is further explained by referring to the graph in the drawing.

In this graph, rising temperature and rising viscosity are represented by the abscissa and ordinate respectively.

The lines A and B, F and G, enclose a hypothetical viscosity section chosen to indicate a definite temperature viscosity range within which stable emulsoids are possible, where their variables are correctly co-related. The areas outside this section represent a range in which stable emulsoids are not possible, even though the variables are properly co-related. The temperatures would extend from a safe limit above the freezing point of water, say about to the maximum polymerization temperatures. The viscosity range would, under preferred conditions, extend between about 30 and about 1,500 cps. D is a typical curve representing a temperature coefficient of viscosity of a member of the positive group of colloids under consideration and the curve C a temperature coefficient of viscosity of a member of the negative group, in the higher temperature range. The extent of the enclosed area in the temperature viscosity section will depend to a large extent on the rate, amount and type of stirring. The resultant coefficient of the two colloids together is represented by the relatively flat curve E. The relative flatness of this curve indicates that the two colloids together have the complementary properties of maintaining a fairly even viscosity under the temperature changes which they encounter before during and after polymerization, thus maintaining the emulsifying capacity of the combination substantially at a maximum for the temperatures encountered.

CONCENTRATIONS

The concentrations of the emulsifying agents effective to protect the emulsion-emulsoid to the desired extent will naturally vary according to the capacity of the individual colloids to act as emulsifying agents, their capacity to co-operate with each other to keep their combined temperature coefficient of viscosity within the prescribed range (i. e. respective temperature viscosity coefficients), the order of the stirring, and other conditions. Generally, the applicant prefers, where two colloids of different coefficients are employed, to use less than about 1.0% by weight of the total charge. Under suitable conditions, as little as about 0.5% or less is effective to protect the emulsion-emulsoid system. Greater concentrations can, of course be used, but this reduces the economy of the process and contaminates the resulting product to a greater extent.

The relative proportions of the respective colloids where near minimal concentrations are employed is critical, although from the above teachings readily determinable by one skilled in the art, from the temperature coefficients of viscosity of the respective colloids. Generally speaking, a ratio of respective agents used together will vary between substantially 2:1 and 1:1 depending on the particular colloids used. One typical concentration is methyl cellulose and gum tragacanth, substantially 2:1 and another methyl cellulose and starch substantially 1:1. In some cases as little as 0.1% of one agent may be employed in combination with larger proportions of other agents.

More than two agents can be employed to effect further reduction in the total concentrations necessary. This is shown in the case of Example VII where about 0.10% hydrolyzed polyvinyl acetate and about 0.25% methyl cellulose are used in combination with about 0.12% gum tragacanth. Here a total concentration of about 0.47% of the total charge is used, while the ratio of positive to negative agents is in the neighborhood of 2:1.

The minimum concentrations of any one agent may also vary considerably. For instance, of the positive type of colloid, the water soluble celluloses may be used in concentrations as low as about 0.2% and the partially hydrolyzed polyvinyl acetates in concentrations as low as about 0.1% by weight of the total charge. Of the negative types of colloids concentrations substantially as low as the following may be used—partially hydrolyzed polyvinyl acetates about 0.4%; gum tragacanth about 0.1%; agar-agar about 0.4%; gum acacia about 0.5%; starch about 0.4; and gelatin about 0.4% by weight of the total charge. It is understood, of course, that where one of these colloids is present in such low concentrations, suitable concentrations of one or more complementary agents having a different temperature coefficient of viscosity must be used to achieve permanent stability in the emulsion over the entire range of temperatures encountered in polymerization, use and storage. These concentrations are, of course, accompanied by adequate stirring.

As has been explained, the concentration of different colloids used together is preferably adjusted so as to reduce substantially to a minimum the total amount of the emulsifying agent effective to make an emulsion-emulsoid which is stable over the entire range of temperatures encountered.

CONDITIONS

The sequence of the addition of the constituents to the emulsion is important. The following sequence should be preserved for optimum results—(1) emulsifying agents and surface tension depressants (2) catalyst (3) monomers. The emulsifying solution is formed first and the surface tension depressant added before the vinyl acetate so as to avoid excessive frothing. The vinyl acetate is added last to assure its becoming the dispersed phase.

The type of stirring is not complicated as will be clear to one skilled in the art. However, the adequacy of stirring (i. e. R. P. M.) for each different type of equipment must be determined experimentally. This is exemplified further by noting that in the examples, the apparatus employed in the stirring was substantially of the following order:

The vessel is an aluminum pot 8" high by 5" in diameter. The stirrer is 16" x ½" of stainless steel. It embodies half an inch from the bottom, 4 blades in a cluster 1" x ½", bent at 45° for downward thrust; four inches from the bottom a pair of blades 2½" x ¾" bent at 45° for downward thrust. The useful speeds, R. P. M. of the blades are 600, 1,000, 1,200, 1,500, 1,800, and 2,100.

In one run the following materials were employed in substantially the concentrations given.

| | |
|---|---|
| Water | grams__ 400 |
| Emulsifier | do____ [1] 400 |
| Vinyl acetate | do____ 930 |
| Catalyst (benzoyl peroxide) | do____ 0.85 |

[1] 200 gms. of a 2½% solution of emulsifier A=0.25% of the total charge+200 gms. of a 5% solution of emulsifier B=0.5% of the total charge.

The procedure was substantially as follows:

A solution was made of the emulsifying agents and added to the water and the charge stirred for five minutes. The catalyst was added as dry powder with stirring. The vinyl acetate was then added to the aqueous phase with slow stirring at about 600 R. P. M. The charge was then stirred for about five minutes, after which it was brought to reflux temperature with stirring and gentle reflux kept up by temperature manipulation until reflux temperature had gone from about 66° C. to the end of reflux at about 84° C. The charge was then cooled slowly with stirring to about 25° C. and drained. In this procedure the stirring range is between about 600 and about 2,100 R. P. M. but each emulsifier admixture generally demands a slightly different stirring speed range, which can easily be determined by experiment.

The use of depressed surface tension helps to obtain a stable emulsion and to eliminate the necessity for complex stirring. This is preferably accomplished by using a suitable depressant. "Aerosol O. T." (the sulphonic acid of dioctyl succinic ester) is satisfactory. Other surface tension depressants may be used as for instance, the other "aerosols", "Aresklene" which is dibutyl phenyl phenol sodium disulfonate, fatty acid soaps of hydroxyethyl ethylene diamine, fatty acid soaps of Merpentine, a sodium alkyl naphthaline sulphonate product, sulphonates of high alcohols and alkyl aryl type wetting agents. A criterion of utility is that the depressant has to be compatible and non-reactive with the other constituents of the charge. The concentration of surface tension depressant should be in the range of between about .05% and about 3.0%. The depressants mentioned are not of themselves emulsifiers but this does not preclude the use of emulsifiers which are also effective to depress the surface tension of the system.

The adequacy of the emulsifying agents at the concentrations employed is such that the temperature may be controlled efficiently and rapidly throughout the polymerization, surprisingly enough through reflux. Their operation seems to be explained by the hypothesis that the added properties of the two emulsifying agents together results in a thin, poorly solvated, high viscosity micellular coat. Polymerization may be carried to practical completion so that the residual amount of monomer in the emulsion is reduced substantially to a minimum, although stability is not impaired. Conversion is usually from about 95% to nearly 100%.

The Emulsoid

The emulsoid formed is permanently stable up to the high temperatures reached in polymerization that is up to about 90° C. and down to the low temperatures that is about 0° C. which might be encountered in storage and transit when the usual precautions are taken.

The characteristics of the emulsoid may be modified to some extent according to the particular emulsifying agents used. Its high solid content as compared with a solution is advantageous. For instance, from an emulsoid containing polyvinyl acetate formed with the combination of the emulsifying agents gum tragacanth and methyl cellulose, a film may be laid down which is unexpectedly pliable and non-blocking. The polymer may also be recovered from the emulsion by precipitation with electrolytes, as for example aluminum sulphate with ammonia, or boric acid.

The emulsoid may be modified by adding at any convenient time, solvents, plasticizers, fillers, pigments, etc. of the types usually employed with the particular polymer forming the dispersed phase and which are inert to the constituents of the charge. For instance, in the case of polyvinyl esters, suitable plasticizers are dibutylphthalate and "3 G. H.". Suitable fillers are iron oxide and titanium oxide. Since these agents can usually be added after polymerization has been completed there is not thought to be any great advantage in adding them during the process.

Uses

There are many uses to which these resins may be applied in emulsoid or solid form, for instance:

As grease proof coatings for articles made of sheet fabrics such as cloth, paper and cardboard. They may be pigmented, filled and/or plasticized.

For impregnating porous materials.

As adhesives and heat sealing compositions.

For compounding with other materials, fillers, for example, to give tough, resilient end products.

As vehicles for carrying metal powders, dyes, carbon black and other electrically conductive solids.

As a chewing gum base.

As a vehicle to bind pigments in coatings.

Advantages

The finished emulsoid is stable under proper precautions up to temperatures reached in the polymerization of said emulsoid, that is to about 90° C. and down to temperatures encountered in storage and transit, that is down to about 0° C. This stability may, for practical purposes, be considered as permanent, since it persists for the period demanded by the market. Generally, emulsions of this type are used within about six months or sooner.

This development has many other advantages. A stable permanent emulsoid containing a resin is made available. A large economy in materials is effected by reason of the low concentrations of emulsifying agents which may be employed. The process itself is easy to carry out because the protective properties of the emulsifying agents in combination render other conditions less critical. The invention makes possible the use of emulsifying agents which could not heretofore be used in polymerization processes. Films having new properties are made available. Other advantages will appear to those skilled in the art.

Modifications

Modifiers such as plasticizers and coloring agents can be added to the original solution before the emulsion is formed or after emulsification. The usual modifying agents for the types of resins being treated are suitable. They must, however, be non-reactant with the emulsifying agents, catalysts and other constituents of the emulsion.

The catalyst is employed to hasten the reaction. The nature of this body will depend upon the particular monomer being treated. For instance, in the case of polyvinyl esters, any peroxide may be employed, as for example, hydrogen peroxide, benzoyl peroxide or acetyl peroxide. The amount of catalyst should be insufficient to cause an uncontrollable reaction. Preferably, it should be such that reflux may be maintained at a minimum with the reflux being used merely as an indication that the reaction is proceeding. Benzoyl peroxide is usually employed in concentrations of between about 0.08% and about 5% of the monomer. Hydrogen peroxide is usually employed at concentrations of between about 0.01% and about 3%. When hydrogen peroxide is used as catalyst it should be supplemented by an alkaline accelerator such as for instance, sodium bicarbonate or magnesium oxide. The accelerator should be present at a concentration effective to adjust the pH of the charge prior to the start of the reaction to between about 6.5 and about 9. These concentrations are regulated by weight on the total charge. The catalyst should be used at concentrations at which the reaction can be controlled. The time of reaction will vary with the concentration of catalyst usually between about 1 and about 6 hours. The reaction is thus completed relatively fast without interfering with the stability of the emulsion-emulsoid.

Water has been named as the non-solvent vehicle for the emulsion. It will be understood that the monomeric substances can be polymerized in any non-solvent vehicle in which the emulsifying agents are operable, but water is most economical and is highly satisfactory.

The term "stable" is used to denote the capacity of the emulsion-emulsoid to retain its form, as such, under the conditions encountered during polymerization and during commercial handling, in contrast to the tendency of many emulsion-emulsoids to "break" under these conditions.

Whereas the colloids used in this invention have been expressed in terms of their temperature coefficients of viscosity, it is understood that in certain cases this may not be an accurate description owing to the tendency of some of the colloids to gel at certain temperatures. However, it can be explained that those having a positive temperature coefficient of viscosity are the colloids that are poorly water soluble at high temperatures and vice versa at low temperatures. The negative group is made up of colloids which may be in the form of a gel, at low temperatures and a thin solution at higher temperatures.

It will be understood that without departing from the spirit of the invention or the scope of the claims, various modifications may be made in the specific expedients disclosed. The latter are illustrative only and not restrictive, it being desired that only such limitations shall be placed thereon as may be required by the state of the prior art.

The sub-titles used throughout the specification are merely to simplify reference thereto and should otherwise be disregarded.

I claim:

1. A stable aqueous emulsion made by emulsion polymerization and obtained by polymerizing in aqueous medium a normally liquid water-insoluble polymerizable monomeric vinyl compound in the presence of an anion-active surface tension depressant in amount effective to aid in obtaining a stable emulsion and within the range from about five hundredths percent to about three percent based on the total charges and as an emulsifying agent, two organic hydrophilic colloids resistant to hydrolysis under mildly alkaline and acidic conditions in aqueous media up to temperatures encountered in the polymerization for a period of several hours and selected from the group consisting of non-ionizable colloids and gelatin, said emulsifying agent being present in amount from about three-tenths of one percent to about one and two-tenths percent by weight of the total charge, there being present at least one tenth percent of each colloid based on the total charge, said colloids being effective together to stabilize said emulsion and no one of said colloids being effective alone at said total concentration to stabilize said emulsion.

2. A stable aqueous emulsion as in claim 1 in which the monomeric vinyl compound is a vinyl ester.

3. A stable aqueous emulsion as in claim 1 in which the monomeric vinyl compound is vinyl acetate.

4. A stable aqueous emulsion in accordance with claim 1 in which said colloids comprise a partially substituted cellulose and a gum.

5. A stable aqueous emulsion according to claim 1 wherein one of said colloids is a partial hydrolysis product of polyvinyl acetate.

6. A stable aqueous emulsion according to claim 1 in which said colloids comprise a partial hydrolysis product of polyvinyl acetate and a gum.

7. A stable aqueous emulsion according to claim 1 in which the monomeric vinyl compound is a vinyl ester and the colloids comprise a partial hydrolysis product of polyvinyl acetate and a gum.

8. A stable aqueous emulsion according to claim 1 in which the monomeric vinyl compound is vinyl acetate and the colloids comprise a partial hydrolysis product of polyvinyl acetate and a gum.

9. A stable aqueous emulsion according to claim 1 in which the colloids comprise a partially substituted cellulose and a partial hydrolysis product of polyvinyl acetate.

10. A stable aqueous emulsion according to claim 1 in which said colloids comprise partial hydrolysis products of polyvinyl acetate of respectively different acetate group contents.

11. A stable aqueous emulsion according to claim 1 in which said colloids comprise partial hydrolysis products of polyvinyl acetate, one having an acetate group content of between about thirty-seven ($\pm 2$) percent and about forty-three percent and another having an acetate group content of between about ten percent and about thirty-five ($\pm 2$) percent.

12. A stable aqueous emulsion according to claim 1 in which the monomeric vinyl compound is a vinyl ester and the colloids are partial hydrolysis products of polyvinyl acetate of respectively different acetate group contents.

13. A stable aqueous emulsion according to claim 1 in which the monomeric vinyl compound is vinyl acetate and the colloids are partial hydrolysis products of polyvinyl acetate of respectively different acetate group contents.

14. A stable aqueous emulsion according to claim 1 in which said colloids comprise a partial hydrolysis product of polyvinyl acetate and gelatin.

15. The process of preparing a stable aqueous emulsion by emulsion polymerization comprising polymerizing in aqueous medium a normally liquid water-insoluble polymerizable monomeric vinyl compound in the presence of an anion-active surface tension depressant in amount effective to aid in obtaining a stable emulsion and within the range from about five hundredths percent to about three percent based on the total charge and as an emulsifying agent, two organic hydrophilic colloids resistant to hydrolysis under mildly alkaline and acidic conditions in aqueous media and up to the temperatures encountered to effect the polymerization for a period of several hours and selected from the group consisting of non-ionizable colloids and gelatin, said emulsifying agent being present in amount from about three-tenths of one percent to about one and two-tenths percent by weight of the total charge, there being present at least one tenth percent of each colloid based on the total charge, said colloids being effective together to stabilize said emulsion and no one of said colloids being effective alone at said total concentration to stabilize said emulsion.

16. The process in accordance with claim 15 wherein the monomeric vinyl compound is vinyl acetate.

17. The process in accordance with claim 15 wherein the monomeric vinyl compound is a vinyl ester.

18. A stable aqueous emulsion according to claim 1 wherein the amount of surface tension depressant is about one tenth percent based on the total charge.

19. A stable aqueous emulsion as in claim 1 in which the monomeric vinyl compound is vinyl acetate and wherein the amount of surface tension depressant is about one-tenth percent based on the total charge.

20. A stable aqueous emulsion according to claim 1 in which the monomeric vinyl compound is vinyl acetate and the colloids comprise a partial hydrolysis product polyvinyl acetate and a gum, and wherein the amount of surface tension depressant is about one-tenth percent based on the total charge.

21. A stable aqueous emulsion according to claim 1 in which the surface tension depressant is present in amount of about 0.05% based on the total charge.

HENRY MICHAEL COLLINS.